United States Patent
Lauer

(10) Patent No.: US 12,170,937 B2
(45) Date of Patent: Dec. 17, 2024

(54) COMMUNICATION SYSTEMS AND METHODS FOR DELIVERING DATA SELECTIVELY OVER UNICAST PATHS AND MULTICAST PATHS

(71) Applicant: GOGO BUSINESS AVIATION LLC, Broomfield, CO (US)

(72) Inventor: Bryan Adrian Lauer, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 18/212,547

(22) Filed: Jun. 21, 2023

(65) Prior Publication Data

US 2024/0196172 A1    Jun. 13, 2024

Related U.S. Application Data

(63) Continuation of application No. 17/744,848, filed on May 16, 2022, now Pat. No. 11,729,585, which is a continuation of application No. 16/865,722, filed on May 4, 2020, now Pat. No. 11,418,924.

(60) Provisional application No. 62/843,079, filed on May 3, 2019.

(51) Int. Cl.
| | |
|---|---|
| H04W 4/06 | (2009.01) |
| H04B 17/336 | (2015.01) |
| H04L 67/12 | (2022.01) |
| H04W 84/06 | (2009.01) |

(52) U.S. Cl.
CPC ............ *H04W 4/06* (2013.01); *H04B 17/336* (2015.01); *H04L 67/12* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 8,295,300 B1 * | 10/2012 | Chartier | H04L 49/201 370/432 |
| 11,418,924 B2 | 8/2022 | Lauer | |
| 2004/0068583 A1 * | 4/2004 | Monroe | H04L 67/5651 709/246 |
| 2005/0037706 A1 | 2/2005 | Settle | |
| 2008/0219154 A1 * | 9/2008 | Durrey | H04N 21/637 348/E7.071 |
| 2013/0315125 A1 | 11/2013 | Ravishankar et al. | |
| 2013/0336319 A1 * | 12/2013 | Liu | H04L 47/32 370/390 |
| 2014/0208132 A1 * | 7/2014 | Cheston | H04L 12/12 713/310 |
| 2014/0219156 A1 * | 8/2014 | Weaver | H04L 12/185 370/312 |
| 2016/0142327 A1 | 5/2016 | Johnson et al. | |

(Continued)

*Primary Examiner* — Minh Trang T Nguyen
(74) *Attorney, Agent, or Firm* — MARSHALL, GERSTEIN & BORUN LLP; Randall G. Rueth

(57) ABSTRACT

Communication systems and methods for receiving and converting multicast data are disclosed. An example communication system includes an airborne central processing unit configured to: convert multicast data received on a multicast fast path via a satellite to unicast data, forward the unicast data to a user device within a vehicle, collect one or more metrics regarding the multicast data, and transmit the one or more metrics to a satellite ground station via the satellite.

20 Claims, 4 Drawing Sheets

(56) References Cited

U.S. PATENT DOCUMENTS

| | | |
|---|---|---|
| 2016/0370184 A1 | 12/2016 | Battista |
| 2017/0347363 A1 | 11/2017 | Roy |
| 2018/0098247 A1 | 4/2018 | Gopal et al. |
| 2018/0167133 A1 | 6/2018 | Choquette |
| 2019/0132044 A1 | 5/2019 | Hreha et al. |
| 2020/0412666 A1* | 12/2020 | Papadantonakis .... H04L 49/103 |
| 2022/0217006 A1* | 7/2022 | Wang ..................... H04L 12/18 |

\* cited by examiner

COMMUNICATION SYSTEMS AND METHODS FOR DELIVERING DATA SELECTIVELY OVER UNICAST PATHS AND MULTICAST PATHS

RELATED APPLICATION

This application is a continuation of U.S. patent application Ser. No. 17/744,848, filed on May 16, 2022, which is a continuation of U.S. patent application Ser. No. 16/865,722, filed on May 4, 2020. U.S. patent application Ser. No. 16/865,722 claims the priority benefit of U.S. Provisional Patent Application Ser. No. 62/843,079, filed on May 3, 2019. U.S. Provisional Patent Application Ser. No. 62/843,079, U.S. patent application Ser. No. 16/865,722, and U.S. patent application Ser. No. 17/744,848 are hereby incorporated herein by reference in their entirety.

FIELD OF THE DISCLOSURE

This disclosure relates generally to communication systems, and more particularly, to communication systems and methods for converting multicast data to unicast data and forwarding the unicast data to a user device within a vehicle.

BACKGROUND

In some conventional satellite modems, a field programmable gate array (FPGA) is used to modulate and demodulate radio frequency (RF) signals, and to forward unicast traffic to processor for routing and handling of overhead messages. Typical processors in conventional satellite modems can only handle about 20 Mbps unicast traffic on a forward link with a sustained reverse link rate of 1 Mbps because the processor doesn't have the processing capability to handle traffic at the rate at which the FPGA can demodulate RF signals. This lack of processing power on a conventional satellite modem can result in drastic underutilization of the forward link.

SUMMARY

The present embodiments may relate to, inter alia, systems and methods for receiving and converting multicast data.

In one aspect, a computer-implemented method for receiving and sending communications on a vehicle may be provided. For example, in one instance, the computer-implemented method may include: (1) converting, by one or more processors, multicast data received on a multicast fast path via a satellite to unicast data; (2) forwarding, by the one or more processors, the unicast data to a user device within a vehicle; (3) collecting, by the one or more processors, one or more metrics regarding the multicast data; and (4) transmitting, by the one or more processors, the one or more metrics to a satellite ground station via the satellite.

In another aspect, an airborne central processing unit (ACPU) for receiving and sending communications on a vehicle may be provided. The ACPU may include one or more processors and one or more non-transitory memories. For example, in one instance, the ACPU may include one or more processors configured to: (1) convert multicast data received on a multicast fast path via a satellite to unicast data; (2) forward the unicast data to a user device within a vehicle; (3) collect one or more metrics regarding the multicast data; and (4) transmit the one or more metrics to a satellite ground station via the satellite.

In another aspect, a computer readable storage medium storing non-transitory computer readable instructions for receiving and sending communications on a vehicle may be provided. For example, in one instance, the instruction, when executed by one or more processors, cause the one or more processors to: (1) convert multicast data received on a multicast fast path via a satellite to unicast data; (2) forward the unicast data to a user device within a vehicle; (3) collect one or more metrics regarding the multicast data; and (4) transmit the one or more metrics to a satellite ground station via the satellite.

Additional, alternate and/or fewer actions, steps, features and/or functionality may be included in one aspect and/or embodiments, including those described elsewhere herein.

Figure 1:
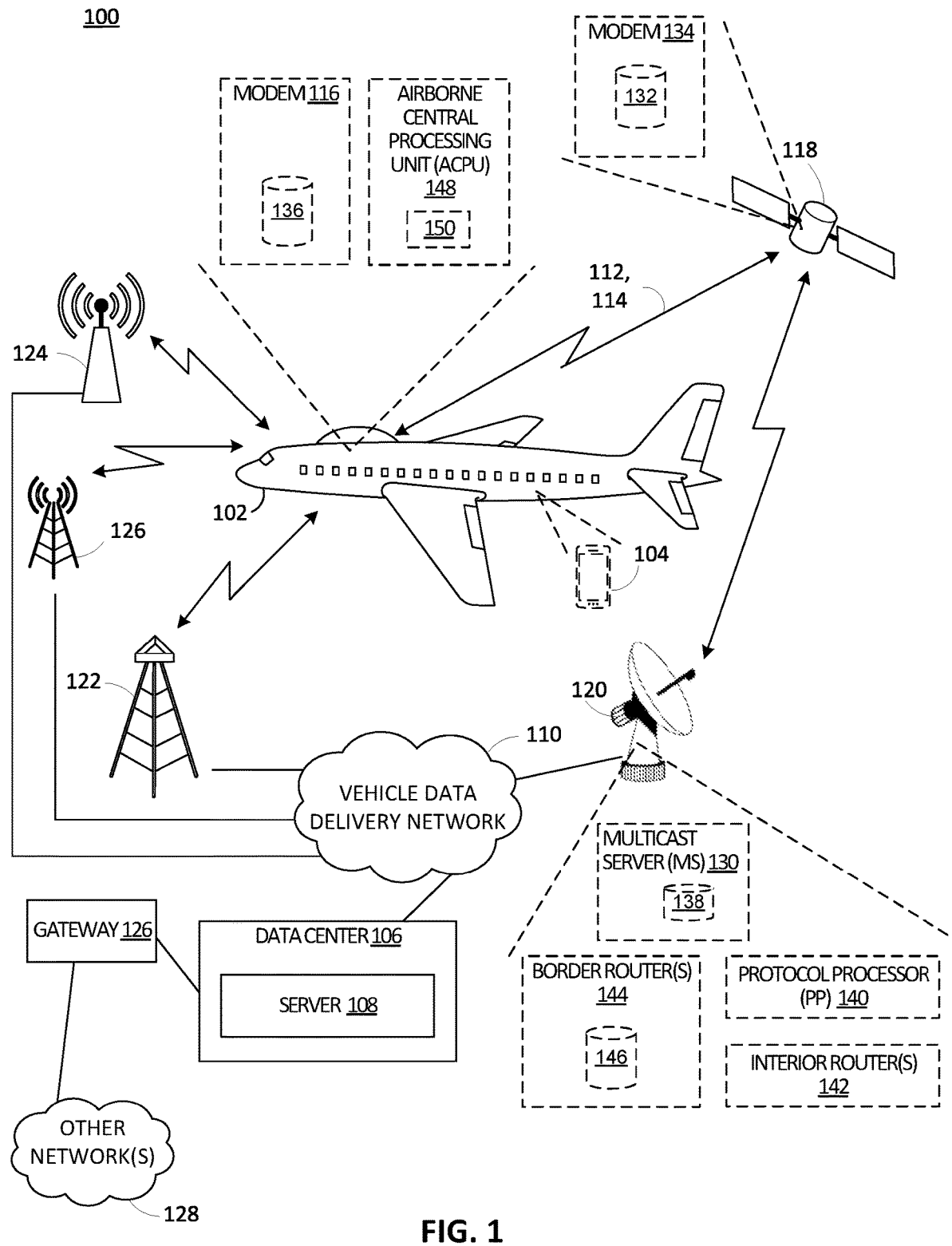
FIG. 1 illustrates an example communication system constructed in accordance with aspects of this disclosure.

The figures depict embodiments of this disclosure for purposes of illustration only. One skilled in the art will readily recognize from the following discussion that alternate embodiments of the structures and methods illustrated herein may be employed without departing from the principles set forth herein. The figures are not to scale. Instead, they are drawn to clarify aspects of this disclosure. Connecting lines or connectors shown in the various figures presented are intended to represent example functional relationships, physical couplings, or logical couplings between the various elements. In general, the same reference numbers will be used throughout the drawing(s) and accompanying written description to refer to the same or like parts.

DETAILED DESCRIPTION

To reduce or eliminate some or all of the problems of under-utilization of a forward link (FL) with conventional satellite modems, example systems and methods are disclosed herein that route (e.g., forward, direct, etc.) demodulated multicast traffic directly to the Ethernet switch of a satellite modem, thereby bypassing a processor (e.g., an advanced reduced instruction set computer (RISC) machine (ARM) processor). This allows data (e.g., information) to be sent at an Ethernet line rate on the forward link (FL) in a multicast mode using, via or over a multicast fast path (MFP). Selectively enabling data to be sent to a satellite modem on a FL at an Ethernet line rate, in some cases, increases FL data throughput by as much as three hundred percent. Thus, delivering data selectively over unicast paths and multicast paths (e.g., changing which of a unicast path or a multicast path is used can be purposefully varied overtime) can increase communication system efficiency, and improve the functionality of user devices communicatively coupled to a satellite modem due to the increase rate at which data can be communicated to a user device. Thus, for example, video and audio can be transported at higher qualities, more complex websites can be accessed in a reasonable time period, larger data files can be downloaded, etc.

Conventionally, data is multicast using a constant modulation and coding (MODCOD). To accommodate varying signal conditions, an adaptive MODCOD is disclosed that accommodates variations in signal-to-noise ratio and/or signal-to-interference+noise ratio (both of which will be referred to simply as an SNR). SNR variations may occur due to a natural slow roll off of signal from center to edge of a network, however, more rapid signal changes can occur due to flight dynamics, mobility events, etc. In some examples, multicast groups are formed for different MFP SNR ranges. Each of the multicast groups can be configured with different MODCOD configurations. Satellite modems, with similar SNRs, can be assigned to a same multicast group. A satellite modem can be assigned to a multicast group by querying a table of multicast groups based on its measured SNR. Further, if the satellite modem's SNR it unstable, then it can be reverted to unicast. A satellite modem, will subsequently refer to in this patent and the appended claim as a satellite modem that is configured to operate in a moving, movable, etc. vehicle such as an aircraft, unless specifically indicated otherwise.

In some examples, when a satellite modem comes into a communication network constructed in accordance with aspects of this disclosure, a protocol processor (PP), which is responsible for tracking and connectivity to the satellite modem, advertises a route to interior (e.g., local) routers of a satellite ground station (e.g., a teleport) via, for example, a routing data protocol (e.g., a routing information protocol (RIP)). The interior router forwards the route to a wider routed network via a border gateway protocol (BGP) update from the satellite ground station to a data center, thereby allowing access to a tail (e.g., a particular aircraft). For unicast, data on the FL bound for the tail is forwarded directly to the PP which encapsulates the data and sends the encapsulated data using an RF signal. In multicast mode using an MFP, a multicast server (MS) which is in the same local area network (VLAN) as the PP in the satellite ground station routes FL VLAN trunk protocol (VTP) traffic bound for the tail to itself by adding a static policy based route (PBR) in the interior routers. When a satellite modem is in multicast mode using an MFP, the MS modifies the destination IP address for the satellite modem to a target multicast IP address for the downstream VTP IP traffic, and routes the multicast traffic to the PP. All other native traffic (e.g., native pings, overhead messages to the satellite modem from the global network management server (GNMS), GNMS SSH (secure shell), etc.) will route directly to the PP via unicast. The conditions for changing to another multicast group or reverting to conventional/default unicast mode is when the receive SNR for a satellite modem falls below the SNR associated with a current multicast group to which the satellite modem is assigned. For reliability, a decision to transition from unicast to multicast mode using an MFP can be delayed until a consistent SNR is measured, while a decision to transition from multicast mode using an MFP to unicast can be made more quickly. When the conditions result in a switch to unicast, the MS will delete the PBR in the local routers and, thus, the local routers will route traffic based on the RIP updates from the PP. This results in data being routed via directly to the serving PP 140.

The decision to perform unicast (default) vs. multicast mode using an MFP routing to the PP is based upon the satellite modem's measured SNR values and/or other criteria. Multicast mode using an MFP vs. unicast is determined by the MS.

Reference will now be made in detail to non-limiting examples, some of which are illustrated in the accompanying drawings.

FIG. 1 illustrates an example communication system 100 constructed in accordance with aspects of this disclosure. The communication system 100 includes an vehicle 102 (e.g., airplane, aircraft, helicopter, etc.) configured to transport cargo, persons (e.g., passengers), etc. having devices (e.g., user devices, electronic devices, audio/visual devices, etc.), one of which is designated at reference numeral 104. Example device 104 include a mobile device (e.g., a cell phone, a smart phone, a tablet such as an IPAD™), a personal digital assistant (PDA), an Internet appliance, a digital versatile disk (DVD) player, a compact disc (CD) player, a Blu-ray disk player, a digital video recorder, a Blu-ray player, a gaming console, a personal video recorder, a set top box, a headset or other wearable device, or any other type of computing device.

The vehicle 102 may be owned and/or operated by a specific individual. In some cases, the vehicle 102 is owned and/or operated by a company, organization or government entity. For example, the vehicle 102 may be included in a fleet of vehicles that are used to transport passengers who pay for or otherwise are granted passage on one of the vehicles of the fleet. The vehicle 102 may be used by an organization to transport employees and/or their guests, in some situations. The vehicle 102 may be used to transport live or inanimate cargo, packages, mail, and/or other types of cargo.

While examples disclosed herein refer to satellite-based communication systems for an airplane for clarity, it should be understood that aspects disclosed herein are applicable to other communication systems that support unicast and multicast links. For example, ground-to-ground communication systems, ship-to-shore communication networks, ground-to-spacecraft communication systems, surface-to-underwater communication systems, etc., and to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

The device 104 receives data, etc. from a data center 106 or from a server 108 (e.g., a GNMS) included in the data center 106. In some implementations, the communication system 100 is configured to deliver feedback data from the vehicle 102 to the data center 106 or the server 108. The data center 106 or the server 108 may use the feedback data to inform subsequent data delivery to the device 104 or to other on-board devices. In an embodiment, the server 108 and the data center 106 are communicatively coupled to the vehicle 102 via one or more vehicle data delivery networks 110, one or more FLs (one of which is designated at reference numeral 112), and one or more RLs (one of which is designated at reference numeral 114). In some examples, the server 108 is implemented by machine- or computer-readable instructions that are stored on non-transitory, tangible, computer-readable storage medium (e.g., one or more memories or data storage entities) that are executable by one or more processors of the data center 106. Additionally and/or alternatively, the server 108 is implemented by one or more special purpose processors. The server 108 may manage data or data delivery, e.g., over the FL 112 and RL 114, to and from device 104 that are being transported by the vehicle 102.

Example data includes user-consumable content data such as a text message, a web page, a media file, streaming data, and/or a response to a previous request received at a user interface of the device 104. The data that is to be delivered to the device 104 may, additionally and/or alternatively, include data that is to be presented at user interfaces of the device 104. In some scenarios, the data that is to be delivered to the device 104 may be an application, a configuration, an update, or software that the user of the device 104 has requested to be downloaded.

The device 104 may be a device that is fixedly connected to the vehicle 102 (e.g., a computing device that is included in a Line Replaceable Unit (LRU) on an aircraft), or the device 104 may be a mobile device such as a smart phone, a tablet or a laptop that is temporarily being transported by the vehicle, e.g., a mobile computing device belonging to a passenger on-board the vehicle 102. In some examples, the device 104 is a computing device including a processor, machine- or computer-readable instructions that are stored on non-transitory, tangible, computer-readable storage medium (e.g., one or more memories or data storage entities) that are executable by the processor, at least one user interface, and at least one wireless network interface.

The FL 112 and a reverse link (RL) 114 may be collectively supported by a multiplicity of RF bands. Typically, a particular frequency band or portion of RF spectrum supporting the FL 112 and the RL 114 is allocated (e.g., by a governmental or regulatory body) for a particular type of wireless communication such as satellite communication, ham-radio communication, terrestrial cellular communication, near-field wireless communication, and the like. In some allocated frequency bands, the wireless communication may be transmitted over the FL 112 and a corresponding RL 114 using a respective wireless communication protocol that is defined, designated or otherwise indicated by a standards association and/or by a government or other regulatory body. A particular frequency band may support a point-to-point wireless protocol and/or may support a broadcast wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Channels included in a frequency band may support (or may be designated to support) the FL 112 and/or the RL 114 for wireless communication. Channels included in a frequency band may be used, additionally and/or alternatively, to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

Different delivery schemes (e.g., broadcast, multicast, unicast) may be used to send data to the vehicle 102 and receive data from the vehicle 102. In general the server 108 may utilize any suitable combination of selected FLs 112, RLs 114, messaging protocols, and/or delivery schemes to transmit data to and receive feedback data from the vehicle 102. For example, the server 108 may cause one or more non-vehicular systems to transmit data to and receive data from the vehicle 102. Non-vehicular systems may be, for example, a substantially stationary terrestrial structure on a building or a tower on the ground, a relatively stationary terrestrial structure on a barge or a ship on water, or a non-terrestrial structure such as a satellite or other structure in space. In some examples, one or more satellite modems 116 are fixedly connected to the vehicle 102 are operated in a unidirectional mode, while one or more other satellite modems, also referred to as transceivers or remotes, fixedly connected to the vehicle 102 are operated in a bi-directional mode. For example, a satellite modem 116 on the vehicle 102 that is tuned to a satellite communication spectrum may operate in a receive-only mode, while another modem on the vehicle 102 is tuned to an direct air-to-ground (ATG) communication spectrum may be utilized in both receive and transmit modes.

Example non-vehicular systems include, but are not limited to a satellite 118 (e.g., the L band (e.g., 40 to 60 GHz or 1 to 2 GHZ), the Ku band (e.g., 12-18 GHZ), the Ka band (e.g., 26.5-40 GHZ), and/or other spectrum that is allocated for satellite communication), a satellite ground station 120, a direct ATG station 120 (e.g., 849-851 MHz and 894-896 MHZ), a Worldwide Interoperability for Microwave Access (WiMax) station 122, a terrestrial mobile or cellular communication station 124 (e.g., Time Division Multiple Access (TDMA), Global System for Mobile Communication (GSM), Code Division Multiple Access (CDMA), Long Term Evolution (LTE), etc.). Other example wireless communication links include infrared, microwave, optical, line-of-sight, etc. Example communication technologies include wireless local area network (WLAN), or wireless fidelity (Wi-Fi™) supported on a Wi-Fi allocated frequency band (e.g., 2.4 GHz and/or 5 GHZ) according to any of the Institute of Electrical and Electronics Engineers (IEEE) 802.x family of standards. It is clear, however, that any suitable wireless communication link including a FL and/or RL may support communication between the data center 106 or the server 108, and the vehicle 102.

Turning now to the vehicle data delivery network 110, in some examples, a portion of the vehicle data delivery network 110 is disposed in a terrestrial location, e.g., a packet network router, an optical switch, etc. may be located within a climate-controlled structure on the ground. Additionally and/or alternatively, a portion of the vehicle data delivery network 110 is disposed in a non-terrestrial location, e.g., a routing node may be disposed on a satellite or aircraft. The vehicle data delivery network 110 may include a public network, a private network, or some combination of public networks and private networks. The vehicle data delivery network 110 may include a communication network, a data network, a packet network, and/or some combination thereof. The vehicle data delivery network 110 may include a hosted network, or may be a peer-to-peer or other type of ad-hoc network. Indeed, the vehicle data delivery network 110 may use any known networking technology or combination(s) thereof for delivering data between the stations 118, 120, 122, 124 and 126, the data center 106 and/or the server 108 at the data center 106. Generally, the vehicle data delivery network 110 includes a plurality of computing devices that are communicatively coupled.

The data center 106 may be communicatively coupled to the vehicle data delivery network 110, and may include one or more communicatively coupled computing devices that collectively appear, to other networks and/or computing devices, as a single logical entity. In some examples, the data center 106 includes the server 108. The data center 106 may be located at least partially in a terrestrial environment, e.g., in one or more stationary buildings or structures. Additionally and/or alternatively, a portion of the data center 106 is located in a non-terrestrial environment, e.g., on an aircraft, satellite, or space station. The data center 106 may be located in any suitable environment, whether stationary, mobile, in a vehicle, terrestrial, or non-terrestrial.

The data center 106, and in particular, the server 108 included in the data center 106, may be communicatively coupled via one or more gateways 126 to one or more other network(s) 128. Generally, a gateway 126 may include one or more communicatively coupled computing devices, and may serve as a boundary between the communication system 100 and one or more other network(s) 128. In some embodiments, at least some of the computing devices included in the gateway 126 may also be included in the data center 106. The one or more other network(s) 128 communicatively coupled with the gateway 126 may include, for example, The Internet, The Public Switched Telephone Network (PSTN), and/or some other public or private network. The one or more network(s) 128 may include any number and/or type(s) of wired and/or wireless networks. Although FIG. 1 illustrates the data center 106 being connected via a single gateway 126 to one or more other network(s) 128, the techniques and principles described herein equally apply to communication systems 100 having and/or being communicatively coupled with any number and/or type(s) of other network(s) 128 via any number and/or type(s) of gateways 126. In some examples, the gateway 126 is omitted.

In some examples, the other network(s) 128 provides data, e.g., via the gateway 126 or via a direct connection, that is to be delivered to a particular device 104 that is on-board the vehicle 102. In some examples, the other network(s) 128 is The PSTN communicatively coupled to a terrestrial, cellular network to which the device 104 is homed, and the data to be delivered to the device 104 is a text message or a voice mail forwarded by the home system. In some examples, the other network(s) 128 are communicatively coupled, via the gateway 126, to one or more computing devices that host a website from which a user of the device 104 requests access, and data associated with the website (e.g., the web page, objects, and links thereon) be delivered to the device 104 for presentation on a user interface of the device 104 in response to the user request. In some examples, the other network(s) 128 is communicatively coupled to a streaming media provider, and a streamed video file is the data to be delivered to the device 104 for consumption by the device's user at a user interface. Of course, any type of data may be provided to the data center 106 by any other network(s) 128 (via the gateway 126, if necessary) for delivery to an indicated device 104 on-board the vehicle 102 (e.g., text messages, web pages, media content, streaming data, a response to a previous request received at a user interface of the device 104, data that is to be presented at a user interface of the device 104, an application, a configuration, or other software that the user of the device 104 has requested to be downloaded from the other network(s) 128). Additionally and/or alternatively, data from the device 104 (e.g., an activation of a user control, a return text message, a request or command, etc.) that is received at the server 108 may be delivered (via the gateway 126, if necessary) to the other network(s) 128.

To control the use of unicast paths and multicast paths to deliver data over the FL 112, the example satellite ground station 120 includes an example multicast server (MS) 130. When FL signal conditions permit (e.g., SNR for FL 112 exceeds an SNR threshold for a pre-determined period of time), the MS 130 re-configures the FL 112 for a multicast mode using MFP. When FL signal conditions no longer permit (e.g., SNR for FL 112 falls below the SNR threshold, possibly for a short period of time), the MS 130 reverts the FL 112 to a unicast mode. When using an MFP, demodulated multicast traffic at the satellite modem 116 is conveyed directly to the Ethernet switch of the satellite modem, thereby bypassing a processor of the satellite modem (e.g., an ARM processor) and allowing data to be sent at an Ethernet line rate over the FL 112. To accommodate varying signal conditions, the MS 130 adaptively configures MODCOD parameters 132 in a satellite modem 134 in the satellite 118, and/or MODCOD parameters 136 in the satellite modem 116 in the vehicle 102. In some examples, multicast groups are formed for different MFP SNR ranges. Each of the multicast groups can be configured with different sets of MODCOD parameters 132, 136. The MS 130 assigns satellite modems 116 with similar SNRs to a same multicast group. In some examples, the MS 130 assigns the satellite modem 116 to a multicast group by querying a table 138 of multicast groups based on its measured receive SNR.

The decision to operate the FL 112 in multicast mode using an MFP is conveyed by the MS 130 to an example PP 140. The PP 140 advertises a route to the MS 130 to interior routers 142 of the satellite ground station 120 via, for example, RIP. The interior routers 142 forward the route to the MS 130 to a wider routed network via, for example, BGP updates on one or more edge or border router(s) 144. The MS 130, which is in the same VLAN as the PP 140, modifies the destination IP address for the satellite modem 116 to a target multicast IP address for the downstream VTP IP traffic. The MS 130 further adds a PBR 146 to the border router(s) 144 to direct VTP traffic with the target multicast IP address to the satellite modem 116 via the PP 140. To enable an airborne central processing unit (ACPU) 148 to ignore data not for a device 104 of the vehicle 102, the target multicast IP address is a unique port number based upon the IP address of the satellite modem 116 (e.g., computed using a hash). Other satellite modems will not listen on this port, and, therefore, corresponding data is dropped at the ACPU 148 of those other ignoring satellite modems. Native traffic (e.g., native pings, overhead messages to the satellite modem 116 from the GNMS, GNMS SSH, etc.) will route directly to the PP 140 via unicast.

In unicast mode, data bound for the FL 112 is routed directly from the edge or border router(s) 144 to the PP 140, which encapsulates the data and conveys the data via the satellite 118 to the vehicle 102 over the FL 112. Thus, when the conditions result in a reversion from multicast mode to unicast mode, the MS 130 deletes the PBR 146 from the interior routers 142 and, thus, the interior routers 142 will route data based on the RIP updates from the PP 140. This results in data being routed via unicast to the PP 140 and, thus, to the satellite modem 116.

While an example communication system 100 is illustrated in FIG. 1, one or more of the elements, processes and devices illustrated in FIG. 1 may be combined, divided, re-arranged, omitted, eliminated or implemented in any other way. Thus, for example, any of the elements, processes and devices illustrated in FIG. 1 and/or, more generally, the communication system 100 could be implemented by one or more of an analog or digital circuit, a logic circuit, a programmable processor, a programmable controller, a graphics processing unit (GPU), a digital signal processor (DSP), an application specific integrated circuit (ASIC), and/or a field programmable gate array (FPGA). Further, the communication system 100 may include one or more elements, processes or devices in addition to, or instead of, those illustrated in FIG. 1, or may include more than one of any or all of the illustrated elements, processes and devices.

Figure 2:
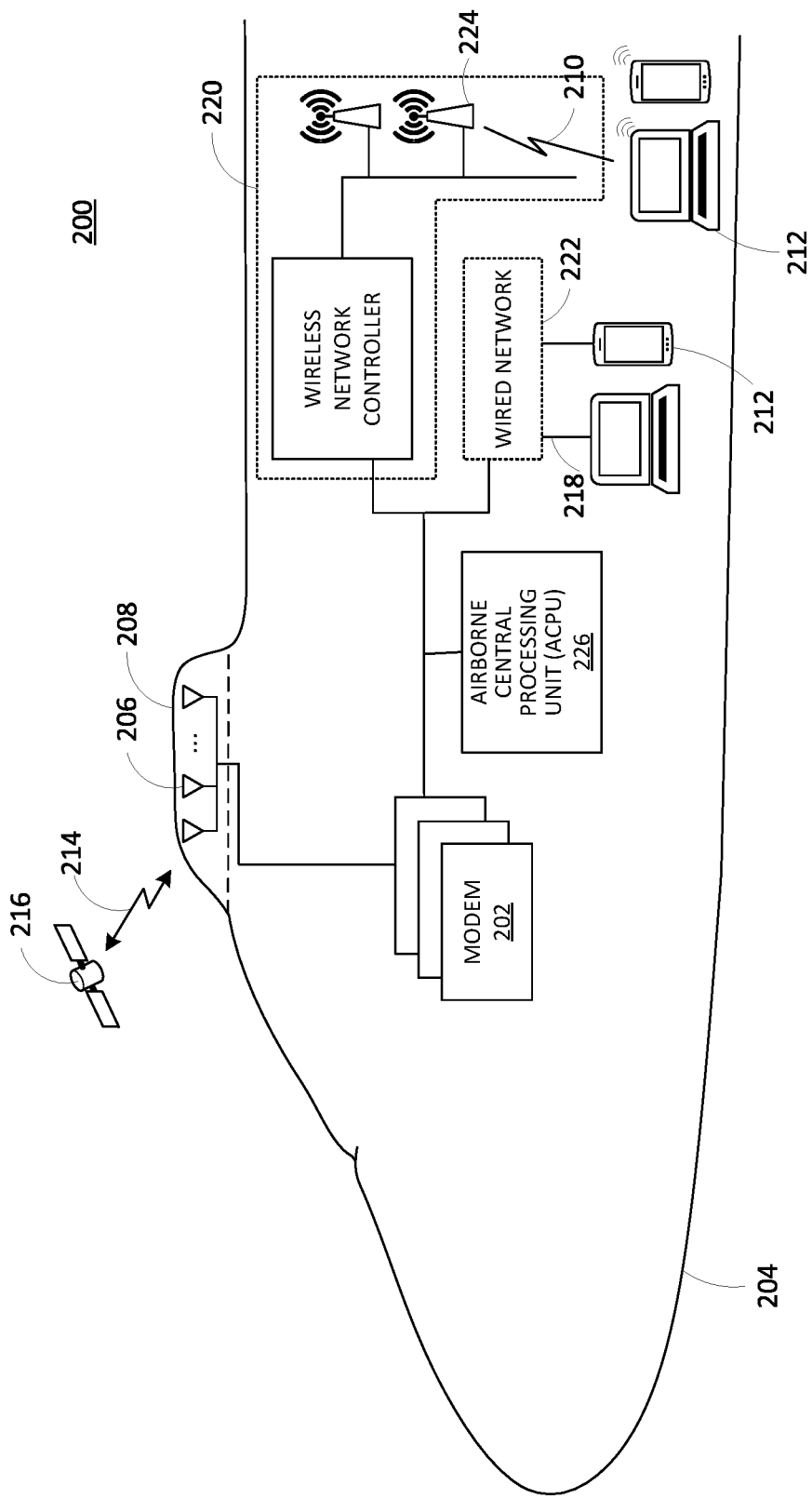
FIG. 2 illustrates an example on-board communication system constructed in accordance with aspects of this disclosure.

Turning to FIG. 2, an example on-board communication system 200 constructed in accordance with aspects of this disclosure is illustrated. The example communication system 200 includes a plurality of satellite modems, one of which is designated at reference numeral 202 (e.g., the example satellite modem 116 of FIG. 1). The satellite modems 202 are fixedly connected to a vehicle 204 (e.g., the vehicle 102 of FIG. 1) and may be tuned to a particular frequency band, and thus, along with a respective antenna 206 in a radome 208, may serve as one end of a satellite communication link with a satellite 216 (e.g., the satellite 118 of FIG. 1) and the satellite ground station 120 over which data may be exchanged with the data center 106 and/or the server 108. Similarly, a modem (not shown for clarity) that is fixedly connected to a structure external to a vehicle may also be tuned to the particular frequency band, and thus, along with a respective antenna, may serve as the other end of the satellite communication link over which the data is received at and/or sent from the vehicle 204.

The vehicle 204 may be associated with at least two communication links; an on-board communication link 210 to support communication with electronic devices 212 while the electronic devices 212 are disposed within the vehicle 204, and a satellite communication link 214 between the vehicle 204 and the satellite 216. Although the communication link 214 is depicted as a satellite-based communication link 214 and is referred to herein in the singular tense, it should be appreciated that other network configurations are envisioned. For example, a communication link may be an air-to-ground (ATG) network communication link. Furthermore, in some embodiments, multiple communication links may be associated with the vehicle 204, e.g., the vehicle 204 may be communicatively connected to both an ATG communication link and the satellite-based communication link 214.

The on-board communication link 210 and/or on-board wired communication links 218 may be configured to be compatible with a wireless network 220 and/or a wired network 222, respectively, with a plurality of different communication standards such as the IEEE 802.x family of standards, Wi-Fi, Ethernet, etc. via one or more transceivers and/or on-board wireless access points 224. It should be appreciated that although certain communication protocols are more suitable for use with the on-board communication links 210, 218, this does not preclude the additional and/or alternative use of less suitable communication protocols.

Example electronic devices 212 include a mobile device (e.g., a cell phone, a smart phone, a tablet such as an IPAD™), a PDA, an Internet appliance, a DVD player, a CD player, a Blu-ray disk player, a digital video recorder, a Blu-ray player, a gaming console, a personal video recorder, a set top box, a headset or other wearable device, or any other type of computing device.

An ACPU 226 (e.g., the example ACPU 148 of FIG. 1), may be configured to determine that some of the data transmitted by the electronic devices 212 is addressed to a location external to the vehicle 204. Accordingly, the ACPU 226 routes the data to the one or more modems 202 to forward and/or transmit this data to the satellite 216 via the communication link 214 for routing to the data's ultimate destination.

Additionally and/or alternatively, the ACPU 226 of the vehicle 204 may be configured to ignore data not directed to a device 212 of the vehicle 204 and/or, more generally, the modem 202. To this end, a unique port number based upon the IP address of the satellite modem 202 can be assigned to the satellite modem 202. The satellite modem 202 will ignore and drop data not directed to its assigned unique port number(s).

While an example communication system 200 is illustrated in FIG. 2, one or more of the elements, processes and devices illustrated in FIG. 2 may be combined, divided, re-arranged, omitted, eliminated or implemented in any other way. Thus, for example, any of the elements, processes and devices illustrated in FIG. 2 and/or, more generally, the communication system 200 could be implemented by one or more of an analog or digital circuit, a logic circuit, a programmable processor, a programmable controller, a GPU, a DSP, an ASIC, and/or an FPGA. Further, the communication system 200 may include one or more elements, processes or devices in addition to, or instead of, those illustrated in FIG. 2, or may include more than one of any or all of the illustrated elements, processes and devices.

A flowchart 300 representative of example processes, methods, logic, hardware, software, computer- or machine-readable instructions, etc. for implementing the MS 130 of FIG. 1. The flowchart 300 may be implemented as an executable program for execution by a processor such as the processor 502 of FIG. 5. The program may be embodied in software or instructions stored on a non-transitory computer- or machine-readable storage medium such as a CD, a hard disk drive (HDD), a DVD, a Blu-ray disk, a cache, a flash memory, a read-only memory (ROM), a random access memory (RAM), or any other storage device or storage disk associated with the processor 502 in which data is stored for any duration (e.g., for extended time periods, permanently, for brief instances, for temporarily buffering, and/or for caching of the data). Further, many other methods of implementing the MS 130 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, an FPGA, a logic circuit, etc.) structured to perform the corresponding operation(s) without executing software or instructions.

Figure 3:
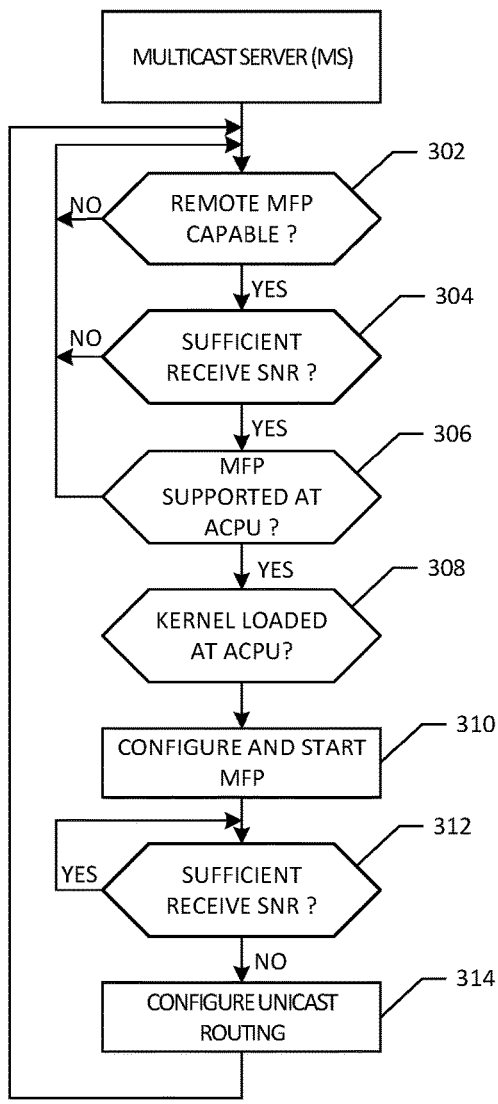
FIG. 3 illustrates flowcharts representative of example processes, methods, logic, hardware, software, or instructions for implementing the multicast server of FIG. 1.

The example program of FIG. 3 begins when an MS (e.g., the MS 130 of FIG. 1) determines whether a presently considered satellite modem (e.g., the satellite modem 116 of FIG. 1) is capable of MFP and is associated with the same satellite ground station as the MS (block 302). Some example considerations for using MFP include average number of users, length of flight, source/destination cities; however the view eventually is that all aircraft in a network/beam would utilize MFP to assure balance downstream service scheduling for each multicast group. In some examples, the MS consults a table (e.g., the table 138 of FIG. 1) to determine whether the presently considered satellite modem is multicast mode using an MFP capable.

If the presently considered satellite modem is multicast mode using an MFP capable (block 302), the MS checks whether the receive SNR at the satellite modem is sufficient for multicast mode using an MFP and the satellite modem is not in a fast fade condition (block 304). For example, if the receive SNR exceeds an pre-determined SNR threshold for a pre-determined period of time, and the receive SNR is not decreasing at a rate greater than a pre-determined rate threshold (less than 1 dB/second).

If the receive SNR is sufficient (block 304), the MS queries an ACPU (e.g., the ACPU 148 of FIG. 1 or the ACPU 226 of FIG. 2) to confirm the ACPU implements multicast mode using an MFP functionality (block 306). For example, by accessing a preconfigured port on the ACPU and getting a response from a process listening on that port. This check can be performed natively over the satellite link, and requires that a remote option file has been configured to the ACPU for port forwarding.

If the ACPU implements multicast mode using an MFP functionality (block 306), the MS confirms that a kernel module 150 (see FIG. 1) has been loaded into the kernel of the ACPU that translates unicast traffic to multicast traffic (block 308). For example, the ACPU continually checks for the presence of the kernel module and conveys results to the MS via a socket connection.

If loading of the kernel module is confirmed (block 308), the MS configures the communication system (e.g., the communication system 100 of FIG. 1) for multicast over MFP, and multicast using MFP status automatically (block 310). For example, the MS, which is in the same VLAN as the PP 140, modifies the destination IP address for the satellite modem 116 to a target multicast IP address (e.g., for the target multicast IP address is computed using a hash of the destination IP address) the downstream VTP IP traffic. For example, by creating a rule in the kernel module to translate unicast IP bound for the satellite modem to the MFP address (common to all satellite modems within the same SNR range). The MS further adds a PBR (e.g., the PBR 146 of FIG. 1) to border router(s) (e.g., the border router(s) 144 of FIG. 1) to direct VTP traffic for the satellite modem 116 to the PP 140. Data being sent to the satellite modem is direct to the unique port number assigned to the satellite modems. Other satellite modems will not listen on this port, and corresponding data is ignored and dropped at the ACPU of those other ignoring satellite modems. Native traffic (e.g., native pings, overhead messages to the satellite modem from the GNMS, GNMS SSH, etc.) will route directly to the PP 140 via unicast.

If the receive SNR drops below a possibly different pre-determined SNR threshold sufficient for multicast mode using an MFP, the satellite modem is in a fast fade condition and/or the satellite modem drops from the communication system (block 312), the MS configures the communication system for unicast, and starts the unicast mode (block 314). For example, the MS calls a script on the border router(s) to remove the PBR that forwards the satellite modem's downstream VTP data to the MS, and deletes the rule in the kernel module of the satellite modem to remove the MFP Unicast to Multicast conversion rule.

A flowchart 400 representative of example processes, methods, logic, hardware, software, computer- or machine-readable instructions, etc. for implementing the ACPU 148 of FIG. 1 and/or the ACPU 226 of FIG. 2. The flowchart 400 may be implemented as an executable program for execution by a processor such as the processor 502 of FIG. 5. The program may be embodied in software or instructions stored on a non-transitory computer- or machine-readable storage medium such as a CD, an HDD, a DVD, a Blu-ray disk, a cache, a flash memory, a ROM, a RAM, or any other storage device or storage disk associated with the processor 502 in which data is stored for any duration (e.g., for extended time periods, permanently, for brief instances, for temporarily buffering, and/or for caching of the data). Further, many other methods of implementing the ACPU 148 and/or the ACPU 226 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, an FPGA, a logic circuit, etc.) structured to perform the corresponding operation(s) without executing software or instructions.

Figure 4:
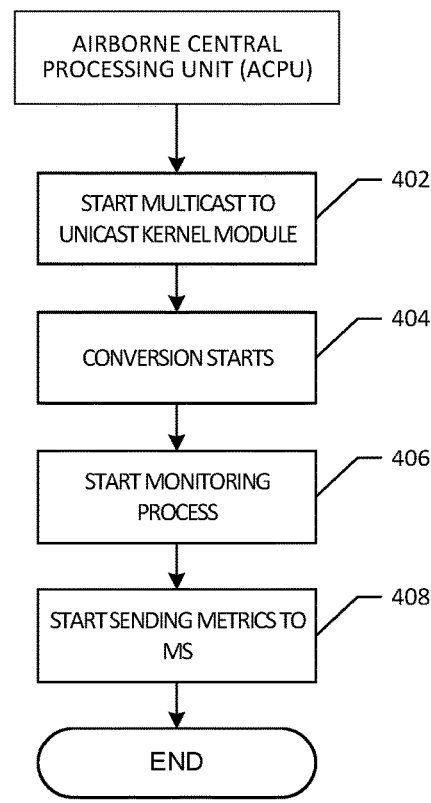
FIG. 4 illustrates flowcharts representative of example processes, methods, logic, hardware, software, or instructions for implementing the airborne central processing unit of FIGS. 1 and 2.

The program of FIG. 4 begins when an ACPU (e.g., the ACPU 148, 226) loads and initializes a kernel module (e.g., the example kernel module 150) into its kernel (block 402). The kernel module 150 converts multicast data received on an MFP from a satellite (e.g., the satellite 118) to unicast data routed to a user device (e.g., the user device 104, 212). The kernel module 150 opens a listening port using a hash of the destination IP address of the satellite modem, which is the same target multicast IP address used by the MS 130. The kernel module 150 forwards converted data to a vtp0 interface. After a Vclient receives the data, no more data manipulation need be performed.

Conversion of multicast data to unicast data starts automatically (block 404). The kernel module 150 does not need to be aware of changes made by the MS 130 to selectively configure a communication system (e.g., the communication system 100) between a unicast mode and a multicast mode.

An ACPU monitoring process is started (block 406). The monitoring process monitors the kernel module 150 to make sure the kernel module 150 is loaded in kernel and has the intended configuration. For example, a reset of the VTP VM may cause a change in the MAC address of the VTP interface which results in the kernel module 150 needing to be reloaded with a new MAC in the configuration. Another process monitors a predefined port (port 15999) on the ACPU to respond to queries from the MS 130 to determine whether the kernel module 150 is running and/or is running the intended version.

Gathering and sending of metrics is started (block 408). The ACPU shall gather metrics regarding data received at the ACPU via multicast mode using an MFP. Example metrics are captured for the uniquely calculated ACPU port in 30 second intervals. This data will be sent to the satellite ground station 120 as part of service measurement. Example metrics include, but are not limited to:
TimeStamp
Latitude
Longitude
Altitude
FlightNumber
CityPair—source city—destination city
FlightState—ground, ASA, BSA & etc. . . .
SystemType
BeamID
SNR
ActiveUserCount
LinkState—Modem link status (unlocked, locked, closed)
OtaRateUcFL(bps)—On the air unicast traffic in FL (bps)
OtaRateMcFL(bps)—On the air multicast traffic in FL (bps)
OtaRateRL(bps)—On the air unicast traffic in RL (bps)
RF Parameters Referring now to FIG. 5, a block diagram of an example computing system 500, in accordance with disclosed embodiments. The example computing system 500 may be used to, for example, implement all or part of the MS 130, the ACPUs 148, 226 and/or, more generally, the communication systems 100, 200. The computing system 500 may be, for example, a server, a computer, a workstation, a router, or any other type of computing device The computing system 500 includes a processor 502, a program memory 504, a RAM 506, and an input/output (I/O) circuit 508, all of which are interconnected via an address/data bus 510. The program memory 504 may store software, and machine- or computer-readable instructions, which may be executed by the processor 502.

Figure 5:
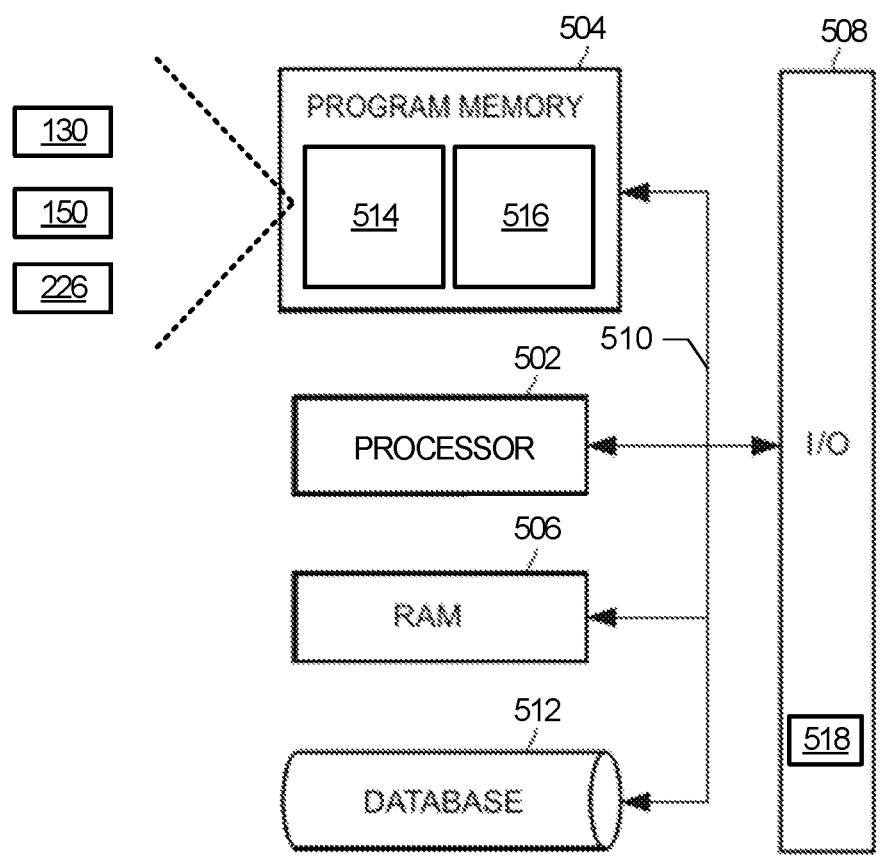
FIG. 5 is a block diagram of an example computing system to implement the various communication systems and methods for delivering data selectively over unicast paths and multicast paths, in accordance with the disclosed embodiments.

It should be appreciated that although FIG. 5 depicts only one processor 502, the computing system 500 may include multiple processors 502. Moreover, different portions of the example the MS 130, the ACPUs 148, 226 and/or, more generally, the communication systems 100, 200 may be implemented by different computing systems such as the computing system 500. The processor 502 of the illustrated example is hardware, and may be a semiconductor based (e.g., silicon based) device. Example processors 502 include a programmable processor, a programmable controller, a GPU, a DSP, an ASIC, an FPGA, etc. The processor 502 may implement the MS 130 and/or the ACPUs 148, 226.

The program memory 504 may include volatile and/or non-volatile memories, for example, one or more RAMs (e.g., a RAM 514) or one or more program memories (e.g., a ROM 516), or a cache (not shown) storing one or more corresponding software, and machine- or computer-instructions. For example, the program memory 504 stores software, logic, machine- or computer-readable instructions, and/or computer-executable instructions that may be executed by the processor 502 to implement any of the MS 130 and the ACPUs 148, 226. Modules, systems, etc. instead of and/or in addition to those shown in FIG. 5 may be implemented. The software, logic, machine-readable instructions, or computer-executable instructions may be stored on separate non-transitory computer- or machine-readable storage mediums, devices or disks, or at different physical locations.

Example memories 504, 514, 516 include any number and/or type(s) of volatile or non-volatile non-transitory computer- or machine-readable storage medium or disk, such as a semiconductor memories, magnetically readable memories, optically readable memories, an HDD, an optical storage drive, a solid-state storage device, an SSD, a RAM, a ROM, a CD, a CD-ROM, a DVD, a Blu-ray disk, a redundant array of independent disks (RAID) system, a cache, a flash memory, or any other storage device or storage disk in which data may be stored for any duration (e.g., permanently, for an extended time period, for a brief instance, for temporarily buffering, for caching of the data, etc.).

As used herein, the term non-transitory computer-readable medium is expressly defined to include any number and/or type(s) of computer-readable storage device, disk, etc., to exclude propagating signals and to exclude transmission media. As used herein, the term non-transitory machine-readable medium is expressly defined to include any number and/or type(s) of machine-readable storage device, disk, etc., to exclude propagating signals and to exclude transmission media.

In some embodiments, the processor 502 may also include, or otherwise be communicatively connected to, a database 512 or other data storage mechanism (one or more hard disk drives, optical storage drives, solid state storage devices, CDs, CD-ROMs, DVDs, Blu-ray disks, etc.). In the illustrated example, the database 512 may be used to store the data 132, 136, 138 and 146.

Although FIG. 5 depicts the I/O circuit 508 as a single block, the I/O circuit 508 may include a number of different types of I/O circuits or components that enable the processor 502 to communicate with peripheral I/O devices. Example interface circuits 508 include an Ethernet interface, a universal serial bus (USB), a Bluetooth® interface, a near field communication (NFC) interface, and/or a PCI express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The I/O circuit 508 may include a number of different network transceivers 518 that enable the computing system 500 to communicate with another computer system, such as the computing system 500 that implement other portions of the communication systems 100, 200 via, e.g., a network (e.g., the communication network(s) 128 such as The Internet). The network transceiver 518 may be the wireless fidelity (Wi-Fi) access point 225, a Bluetooth transceiver, an infrared transceiver, a cellular transceiver, an Ethernet network transceiver, an asynchronous transfer mode (ATM) network transceiver, a digital subscriber line (DSL) modem, a dialup modem, the satellite modems 116, 134, 202, a cable modem, etc.

From the foregoing, it will be appreciated that example communication systems and methods have been disclosed that convey data selectively over unicast paths and multicast paths according to network conditions. From the foregoing, it will be appreciated that communication systems and methods have been disclosed which enhance the operations of the computing systems and communication systems by, at least, increasing the rate at which data can be conveyed to, for example, a satellite modem located in, for example, a moving vehicle such as an aircraft. The disclosed communication systems and methods improve the efficiency of satellite ground stations, satellites, satellite modems and/or communication systems by selectively using a unicast path and a multicast path using an MFP based on network conditions. Furthermore, example communication systems and methods disclosed herein overcome transmission rate limitations of prior art communication systems. The disclosed communication systems and methods are accordingly directed to one or more improvement(s) in the functioning of computing systems and, more generally, communication systems.

Example methods, apparatus, and articles of manufacture to deliver data selectively over unicast paths and multicast paths are disclosed herein. Further examples and combinations thereof include at least the following.

Example 1 is a communication system comprising:
a satellite;
a satellite modem configured to operate within a movable vehicle, wherein the satellite modem is configured to communicatively couple with the satellite, and wherein the satellite modem is configured to convey data, received from the satellite over a forward link (FL), to a user device within the vehicle; and
a satellite ground station having a multicast server, wherein the multicast server is configured to select one of a unicast mode or a multicast mode for the FL based upon a measured receive signal-to-noise ratio (SNR) associated with the satellite modem, wherein the satellite communicates with the satellite modem over the FL in the selected one of the unicast mode or the multicast mode.

Example 2 is the communication system of example 1, further comprising a protocol processor, wherein the multicast server is configured to, when the multicast mode is selected:
 determine a unique Internet protocol port address for the satellite modem; and
 add a static policy based route to a local router in the satellite ground station to configure the local router to divert virtual local area network data addressed to the satellite modem to the multicast server;
 modify a destination address for the data to the unique Internet protocol port address for the satellite modem to form modified data; and
 direct the modified data to the protocol processor.

Example 3 is the communication system of example 1, further comprising a protocol processor, wherein the multicast server is configured to, when the multicast mode is selected, configure the communication system to:
 route data addressed to the satellite modem to the multicast server; and
 route the data from the multicast server to the protocol processor.

Example 4 is the communication system of any of examples 1 to 3, further comprising an edge router, wherein configuring the communication system to route data addressed to the satellite modem to the multicast server includes configuring the edge router with a route to the multicast server.

Example 5 is the communication system of any of examples 1 to 4, wherein the multicast server is configured to configure the communication system to route incoming data for the satellite modem over a multicast path to an Internet protocol port address unique to the satellite modem.

Example 6 is the communication system of any of examples 1 to 5, further comprising an aircraft control processing unit located in the vehicle, wherein the multicast server is configured to confirm the aircraft control processing unit supports multicast mode using a multicast fast path prior to selecting the multicast mode.

Example 7 is the communication system of any of examples 1 to 6, wherein the multicast server is configured to select one of the unicast mode or the multicast mode by comparing the SNR to a pre-determined threshold SNR.

Example 8 is the communication system of any of examples 1 to 7, wherein the multicast server is configured to:
 when the multicast mode is selected, configure a first set of modulation and coding parameters to the satellite modem for the FL; and
 when the unicast mode is selected, configure a second set of modulation and coding parameters to the satellite modem for the FL.

Example 9 is the communication system of any of examples 1 to 8, wherein the multicast server is configured to, when the multicast mode is selected,
 select a multicast group by comparing the SNR to a plurality of pre-determined threshold SNRs;
 when the multicast group is a first of the multicast groups is selected, configure a first set of modulation and coding parameters to the satellite modem for the FL; and
 when the multicast group is a second of the multicast groups is selected, configure a second set of modulation and coding parameters to the satellite modem for the FL.

Example 10 is a computer-implemented method to selectively route data over unicast paths and multicast paths comprising:
 measuring, with a processor, a receive signal-to-noise ratio (SNR) for a forward link (FL) from a satellite to a satellite modem within a movable vehicle;
 selecting, with a processor, one of a unicast mode or a multicast mode for the FL based upon the receive SNR; and
 when the multicast mode is selected, configuring the communication system to,
  route data addressed to the satellite modem to the multicast server, and
  route the data from the multicast server to a protocol processor.

Example 11 is the computer-implemented method of example 10, further comprising:
 compare the receive SNR to a first pre-determined SNR threshold to determine when to select the multicast mode; and
 compare the receive SNR to a second pre-determined SNR threshold to determine when to select the unicast mode.

Example 12 is the computer-implemented method of example 10 or example 11, further comprising routing the data from the protocol processor to the satellite modem using an Internet protocol port address unique to the satellite modem.

Example 13 is the computer-implemented method of any of examples 10 to 12, wherein configuring the communication system to route data addressed to the satellite modem to the multicast server includes adding a static policy based route to a local router in a satellite ground station to configure the router to direct virtual local area network data addressed to the satellite modem to the multicast server.

Example 14 is the computer-implemented method of any of examples 10 to 13, wherein configuring the communication system to route the data from the multicast server to the protocol processor includes:
 determining a unique port address for the satellite modem; and
 modifying a destination address for the data to the unique Internet protocol port address;

Example 15 is the computer-implemented method of any of examples 10 to 14, wherein determining the unique port address for the satellite modem includes computing a hash of an Internet protocol address assigned to the satellite modem.

Example 16 is the computer-implemented method of any of examples 10 to 15, further comprising confirming an aircraft control processing unit as the satellite modem supports multicast mode prior to selecting the multicast mode.

Example 17 is the computer-implemented method of any of examples 10 to 16, wherein determining the unique port address for the satellite modem includes selecting a port address that indicates which other satellite modems are to ignore the data.

Example 18 is the computer-implemented method of any of examples 10 to 17, further comprising selecting the one of the unicast mode or the multicast mode by comparing the SNR to a pre-determined threshold SNR.

Example 19 is the computer-implemented method of any of examples 10 to 18, further comprising comparing a decrease rate for the SNR to a pre-determined threshold to determine when the switch from the multicast mode to the unicast mode.

Example 20 is the computer-implemented method of any of examples 10 to 19, further comprising, when the multicast mode is selected:

selecting a multicast group by comparing the SNR to a plurality of pre-determined threshold SNRs;

when the multicast group is a first of the multicast groups is selected, configuring a first set of modulation and coding parameters to the satellite modem for the FL; and when the multicast group is a second of the multicast groups is selected, configuring a second set of modulation and coding parameters to the satellite modem for the FL.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," "communicatively coupled," etc. including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The communication systems and methods described herein are directed to improvements to computer and communication system functionality and performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer implemented method of receiving and sending communications on a vehicle, comprising:

converting, by one or more processors, multicast data received on a multicast fast path via a satellite to unicast data;

forwarding, by the one or more processors, the unicast data to a user device within the vehicle;

collecting, by the one or more processors, one or more metrics regarding the multicast data; and transmitting, by the one or more processors, the one or more metrics to a satellite ground station via the satellite.

2. The computer implemented method of claim 1, further comprising:

receiving, by the one or more processors, data comprising a destination address from the user device;

determining, by the one or more processors, that the destination address is external to the vehicle; and transmitting, by the one or more processors, the data to a satellite ground station via the satellite.

3. The computer implemented method of claim 1, further comprising:

receiving, by the one or more processors, via the satellite a multicast fast path functionality query from a multicast server on a preconfigured port number; and responding, by the one or more processors, via the satellite to the multicast fast path functionality query.

4. The computer implemented method of claim 1, further comprising:

listening, by the one or more processors, for the multicast data on a unique port number, wherein the unique port number is a hash of a satellite modem IP address.

5. The computer implemented method of claim 4, further comprising:

determining, by the one or more processors, whether multicast data is destined for a different vehicle by comparing a port number of the multicast data to the unique port number; and responsive to determining that the multicast data is destined for the different vehicle, ignoring, by the one or more processors, the multicast data.

6. The computer implemented method of claim 1, wherein the one or more metrics are collected and transmitted periodically.

7. The computer implemented method of claim 1, wherein the one or more metrics comprise one or more of a beam ID, a signal-to-noise ratio, and a radio frequency parameter.

8. An airborne central processing unit (ACPU) for receiving and sending communications on a vehicle, the ACPU comprising:

one or more processors; and one or more non-transitory memories storing instructions that, when executed by the one or more processors, cause the ACPU to:

convert multicast data received on a multicast fast path via a satellite to unicast data;

forward the unicast data to a user device within the vehicle;

collect one or more metrics regarding the multicast data; and transmit the one or more metrics to a satellite ground station via the satellite.

9. The ACPU of claim 8, wherein the instructions, when executed by the one or more processors, further cause the ACPU to:

receive data comprising a destination address from the user device;

determine that the destination address is external to the vehicle; and transmit the data to a satellite ground station via the satellite.

10. The ACPU of claim 8, wherein the instructions, when executed by the one or more processors, further cause the ACPU to:

receive via the satellite a multicast fast path functionality query from a multicast server on a preconfigured port number; and respond via the satellite to the multicast fast path functionality query.

11. The ACPU of claim 8, wherein the instructions, when executed by the one or more processors, further cause the ACPU to:

listen for the multicast data on a unique port number, wherein the unique port number is a hash of a satellite modem IP address.

12. The ACPU of claim 11, wherein the instructions, when executed by the one or more processors, further cause the ACPU to:

determine whether multicast data is destined for a different vehicle by comparing a port number of the multicast data to the unique port number; and responsive to determining that the multicast data is destined for the different vehicle, ignore the multicast data.

13. The ACPU of claim 8, wherein the one or more metrics are collected and transmitted periodically.

14. The ACPU of claim 8, wherein the one or more metrics comprise one or more of a beam ID, a signal-to-noise ratio, and a radio frequency parameter.

15. A computer readable storage medium storing non-transitory computer readable instructions for receiving and sending communications on a vehicle, wherein the instructions, when executed on one or more processors, cause the one or more processors to:

convert multicast data received on a multicast fast path via a satellite to unicast data;

forward the unicast data to a user device within the vehicle;

collect one or more metrics regarding the multicast data; and transmit the one or more metrics to a satellite ground station via the satellite.

16. The computer readable storage medium of claim 15, wherein the instructions, when executed by the one or more processors, further cause the one or more processors to:

receive data comprising a destination address from the user device;

determine that the destination address is external to the vehicle; and transmit the data to a satellite ground station via the satellite.

17. The computer readable storage medium of claim 15, wherein the instructions, when executed by the one or more processors, further cause the one or more processors to:

receive via the satellite a multicast fast path functionality query from a multicast server on a preconfigured port number; and respond via the satellite to the multicast fast path functionality query.

18. The computer readable storage medium of claim 15, wherein the instructions, when executed by the one or more processors, further cause the one or more processors to:

listen for the multicast data on a unique port number, wherein the unique port number is a hash of a satellite modem IP address.

19. The computer readable storage medium of claim 18, wherein the instructions, when executed by the one or more processors, further cause the one or more processors to:

determine whether multicast data is destined for a different vehicle by comparing a port number of the multicast data to the unique port number; and responsive to determining that the multicast data is destined for the different vehicle, ignore the multicast data.

20. The computer readable storage medium of claim 15, wherein the one or more metrics comprise one or more of a beam ID, a signal-to-noise ratio, and a radio frequency parameter.

* * * * *